(12) United States Patent
Ohm et al.

(10) Patent No.: US 8,887,769 B1
(45) Date of Patent: Nov. 18, 2014

(54) RECHARGEABLE TIRE INFLATOR WITH ADAPTABLE HOSE HOLDER

(75) Inventors: Patrick L. Ohm, Mesa, AZ (US); Alan Okamura, Santa Cruz, CA (US)

(73) Assignee: Bell Automotive Products, Inc., Scottsdale, AZ (US)

(*) Notice: Subject to any disclaimer, the term of this patent is extended or adjusted under 35 U.S.C. 154(b) by 416 days.

(21) Appl. No.: 13/342,897

(22) Filed: Jan. 3, 2012

Related U.S. Application Data

(60) Provisional application No. 61/429,700, filed on Jan. 4, 2011.

(51) Int. Cl.
*B65B 31/00* (2006.01)

(52) U.S. Cl.
USPC ............................................. 141/38; 152/415

(58) Field of Classification Search
CPC .............................. B60C 23/00; B29C 73/166
USPC ............................................. 141/38; 152/415
See application file for complete search history.

(56) References Cited

U.S. PATENT DOCUMENTS

| | | | | | |
|---|---|---|---|---|---|
| 1,156,078 A | * | 10/1915 | Holden et al. | ................ | 194/294 |
| 2,042,510 A | * | 6/1936 | Cornelius et al. | ............ | 417/44.5 |
| 4,289,225 A | * | 9/1981 | Scholta | ......................... | 194/241 |
| 4,621,984 A | * | 11/1986 | Fussell | ............................ | 417/234 |
| 4,715,787 A | * | 12/1987 | Hung | .............................. | 417/63 |
| 4,830,579 A | * | 5/1989 | Cheng | ........................... | 417/234 |
| 5,568,117 A | * | 10/1996 | Hsu | ................................ | 340/321 |
| 5,709,295 A | * | 1/1998 | Johnson | ........................ | 194/350 |
| 6,044,954 A | * | 4/2000 | McLaughlin | ................. | 194/241 |
| 6,412,524 B1 | * | 7/2002 | Fogal, Sr. | ......................... | 141/38 |
| 8,191,586 B2 | * | 6/2012 | Huval et al. | ..................... | 141/38 |
| 8,251,106 B2 | * | 8/2012 | Lolli | ................................ | 141/38 |
| 8,596,310 B2 | * | 12/2013 | Senno et al. | ..................... | 141/38 |
| 8,640,744 B2 | * | 2/2014 | Dowel | ............................ | 141/38 |

* cited by examiner

*Primary Examiner* — Timothy L Maust
(74) *Attorney, Agent, or Firm* — Booth Udall Fuller, PLC

(57) ABSTRACT

The present disclosure describes a structure for a wall-mountable tire inflator that includes a housing having a variable pressure pump motor and rechargeable battery therein, a face, a backside opposite the face, four sides extending between the face and the backside, and an opening sized to receive a post of an air hose support tray. The backside of the housing may include at least one wall mounting element adapted to couple with a wall mount structure extending from a wall. The tire inflator may also include a coiled air hose extending from the housing, a light bar pivotally coupled to the housing. The detachable air hose support tray may include an annular channel on a side surrounding a raised central projection, a post extending radially from the support tray, and a wall mounting aperture extending through a portion of the support tray.

16 Claims, 5 Drawing Sheets

RECHARGEABLE TIRE INFLATOR WITH ADAPTABLE HOSE HOLDER

CROSS REFERENCE TO RELATED APPLICATIONS

This document claims the benefit of the filing date of U.S. Provisional Patent Application 61/429,700, entitled "PORTABLE TIRE INFLATOR" to Ohm which was filed on Jan. 4, 2011, the contents of which are hereby incorporated by reference.

BACKGROUND

1. Technical Field

Aspects of this document relate generally to portable tire inflators.

2. Background Art

Flat tires are a problem to which no car owner is immune. Typically, car owners or drivers will, upon discovering a flat or a low tire, drive to the nearest service station to inflate or fix the tire, or replace the problematic tire with a spare tire. Such remedies are typically inconvenient and time consuming for the car owner or driver.

SUMMARY

Aspects of a wall-mountable tire inflator may comprise a housing comprising a variable pressure pump motor and rechargeable battery therein, a face, a backside opposite the face, and four sides extending between the face and the backside, at least one wall mounting element on the backside of the housing adapted to couple with a wall mount structure extending from a wall, a light bar pivotally coupled to the housing at an intersection of the face and one side of the four sides, the light bar adapted to pivot at least 90 degrees to emit light from either the face or the one side, a coiled air hose extending from the housing and in fluid communication with the pump motor such that when the pump motor is activated pressurized air from the pump motor is passed to the air hose, an air pressure indicator responsive to air pressure within the air hose, the air pressure indicator visible on an external surface of the housing, a detachable air hose support tray comprising an annular channel on a first side surrounding a raised central projection, a post extending radially from the support tray and a wall mounting aperture extending through a portion of the support tray, an opening in the housing sized to receive the post of the air hose support tray, and a power switch disposed on the housing and electrically coupled to the light bar and to the pump motor.

Particular embodiments and implementations may comprise one or more of the following features. The housing may comprise first and second handles extending therefrom and parallel to each other. The wall-mountable tire inflator may comprise a pump power switch configured to alternate settings of the pump motor between off, low, and high settings. The wall-mountable tire inflator may comprise a light switch configured to activate or deactivate the pivoting light bar. The wall-mountable tire inflator may comprise an air pressure regulator operably associated with the motor to prevent the tire inflator from inflating a tire through the air hose beyond a preset tire air pressure value. The air pressure display may comprise a digital air pressure gauge that displays tire air pressure during tire inflator use. The wall-mountable tire inflator may comprise programming buttons on the digital air pressure gauge, the programming buttons operable to allow a user to establish the preset tire pressure value. The wall-mountable tire inflator may comprise an inflation adapter and deflation adapter on the face of the body. The wall-mountable tire inflator may comprise a 12 volt DC receiver on the face of the housing, the 12 volt DC receiver electrically configured to transmit power to 12 volt electrical device. The wall-mountable tire inflator may comprise a fuse receiver on the face of the housing, the fuse receiver configured to receive an electrical fuse. The support tray may comprise a wall around the annular channel, the wall comprising a reentrant opening. The center projection may comprise a center projection channel therethrough aligned with the wall mounting aperture. The support tray projection may comprise a key at a leading end of the projection. The opening in the housing may comprise an opening shape that mates with the key of the projection leading end, the mating of the projection and the opening comprising a first position wherein the projection is unlocked and moves freely in and out of the opening, and a second position wherein the projection is locked and is restricted in its movement from the opening.

Aspects of a tire inflator may comprise a housing comprising a variable pressure pump motor therein, a coiled air hose extending from the housing and in fluid communication with the pump motor such that when the pump motor is activated pressurized air from the pump motor is passed to the air hose, a valve stem connector on a valve stem end of the air hose distal the housing, a detachable air hose support tray comprising an annular channel on a first side surrounding a raised central projection, a post extending radially from the support tray and a wall mounting aperture extending through a portion of the support tray, and an opening in the housing sized to receive the post of the air hose support tray.

Aspects of a tire inflator may comprise a housing comprising a variable Particular embodiments and implementations may comprise one or more of the following features. The tire inflator may comprise a light bar pivotally coupled to the housing at an intersection of a face of the housing and a side of four sides of the housing, the light bar adapted to pivot at least 90 degrees to emit light from either the face or the one side. The tire inflator may comprise an air pressure indicator responsive to air pressure within the air hose, the air pressure indicator visible on an external surface of the housing. The tire inflator may comprise a power switch disposed on the housing and electrically coupled to the light bar and to the pump motor. The support tray may further comprise a wall around the annular channel, the wall comprising a reentrant opening. The center projection may comprise a center projection channel therethrough aligned with the wall mounting aperture.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended tire inflator and/or assembly procedures for a tire inflator will become apparent for use with implementations of tire inflators from this disclosure. Accordingly, for example, although particular tire inflators are disclosed, such tire inflators and implementing components may comprise any shape, size, style, type, model, version, measurement, concentration, material, quantity, and/or the like as is known in the art for such tire inflators and implementing components, consistent with the intended operation of tire inflators.

Figure 1:
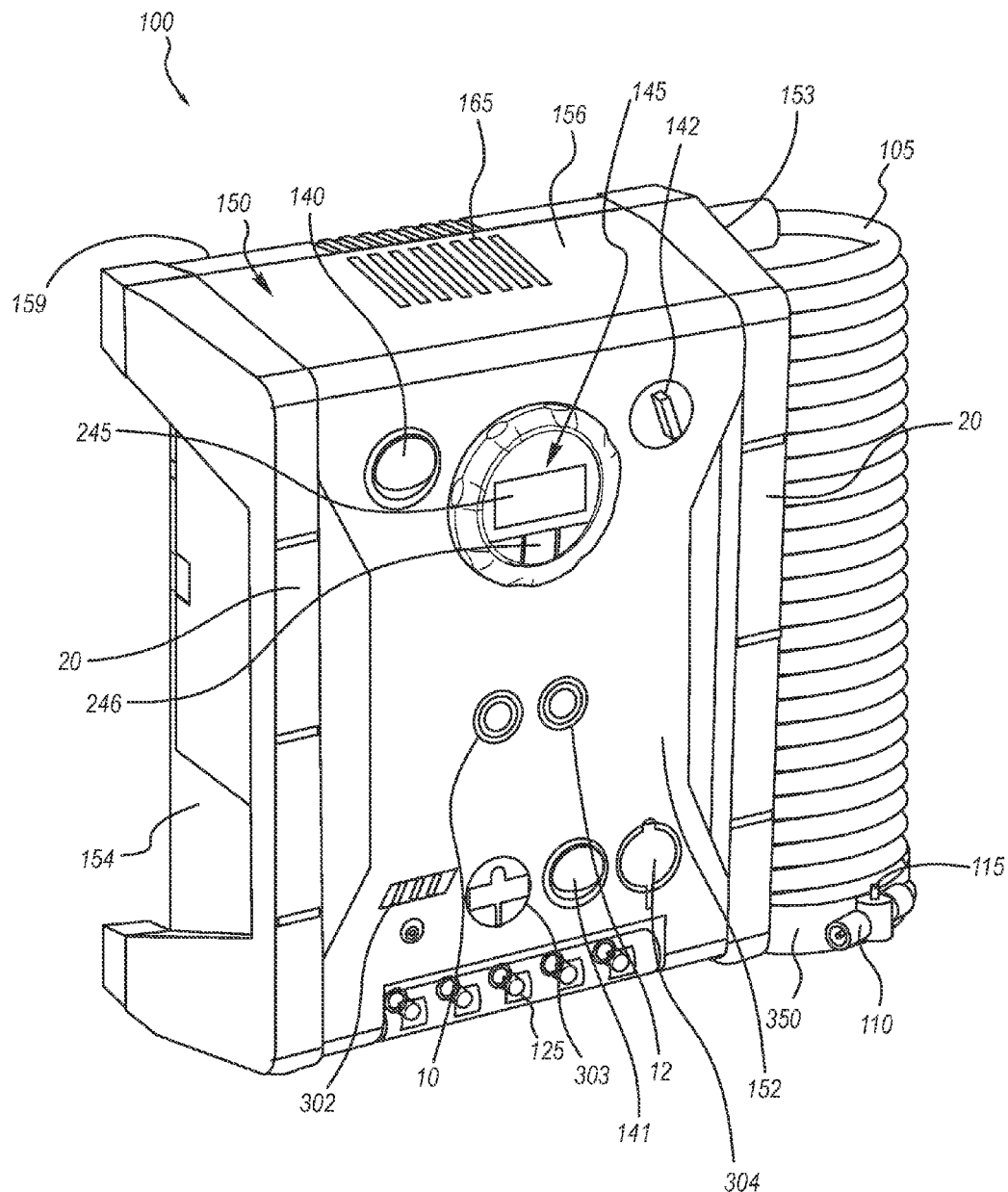
FIG. 1 is a perspective view of a portable wall-mount inflator.

As illustrated in FIG. 1, implementations of a tire inflators 100 may comprise a housing 150 with a pump motor housed therein. Any pump motor known to those having skill in the art is contemplated for use in the housing of this disclosure such as, but not limited to, single speed motors, variable speed motors, and the like. The housing 150 may further house a rechargeable battery in various implementations. The housing 150 may further comprise a face 152, a backside 159 opposite the face 152, and four sides extending between the face 152 and the backside 159.

The housing may further comprise a plurality of air vents disposed anywhere on the housing. In the implementation illustrated in FIG. 1, the tire inflator 100 comprises side air vents 160 (shown in FIG. 2) and top air vents 165. The side air vents 160 may be disposed on any sides of the housing. The top air vents 165 may be disposed on any sides of the housing 150, such as a top side of the housing 150. In a particular implementation, the side air vents 160 may comprise air intake vents through which the pump motor may draw air into the housing 150. In such an implementation, the top air vents 165 comprise air exhaust vents through which the pump motor exhausts air out of the housing 150. Such a configuration assists to reduce the likelihood of overheating of the pump motor and excessive temperatures within the housing 150. Similarly, in another implementation, the side air vents 160 may comprise air exhaust vents through which the pump motor exhausts out of the housing 150, while the top air vents 165 comprise air intake vents through which the pump motor draws air into the housing 150. These and other implementations may utilize a forced air cooling technology, wherein an air-cooled motor assembly helps to reduce the likelihood of overheating.

A tire inflator 100 may further comprise an air hose 105 extending from the housing 150. In some implementations, the air hose 105 may extend from a first side 153 of the four sides of the housing 150, while in other implementations, the air hose 150 may extend from any portion of the housing 150, including but not limited to the face 152, backside 159, or any side of the four sides. The air hose 105 may be in fluid communication with the pump motor such that when the pump motor is activated, pressurized air from the pump motor is passed to the air hose 105. The air hose 105 may then transfer pressurized air into a tire to inflate the tire. The air hose 105 may comprise any flexible, coiled, or otherwise bendable hose suitable for transferring air. In the implementation of FIG. 1, the hose comprises a coiled rubber hose 105 that, when coiled, extends down the first side 153 of the housing 150 from the top of the housing 150 to the bottom of the housing 150. In some implementations, transfer of air from the air hose 105 to the tire is facilitated by a valve stem connector 110 on an end of the air hose 105 distal to the housing 150. The valve stem connector 110 may connect to a valve stem of a tire, inner tube, or any other inflatable object. The air hose 105 may further comprise a bleeder valve element 115 that allows a user to manually release small or controlled amounts of air from the tire or from the air pump by pressing on the bleeder valve element 115.

Figure 3:
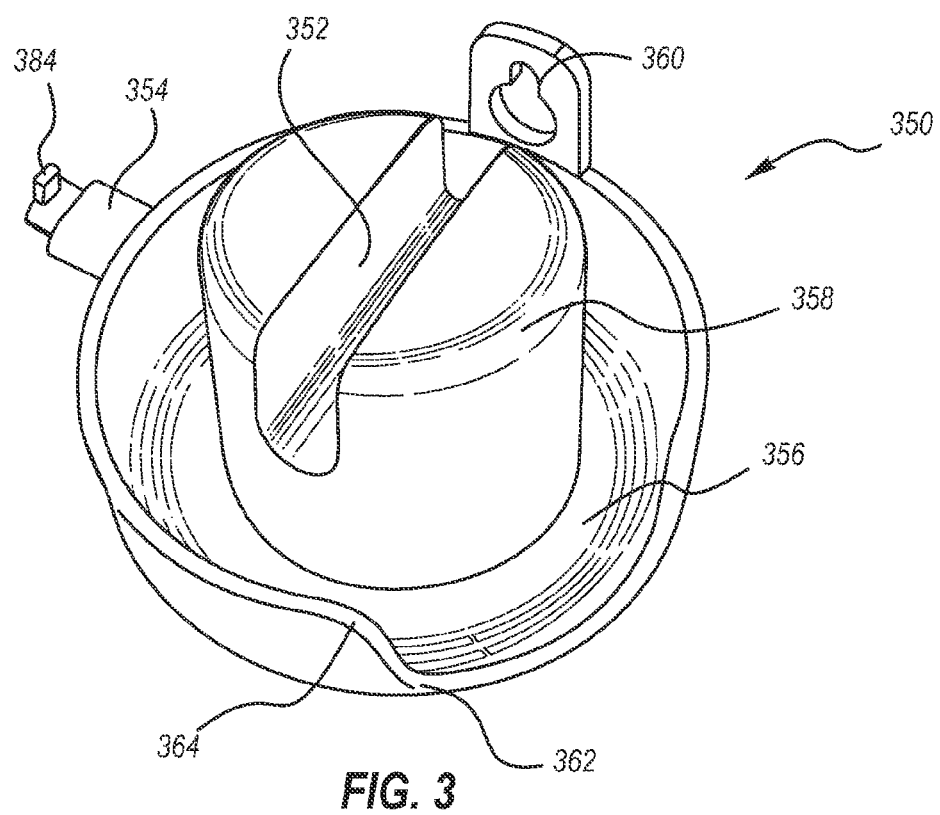
FIG. 3 is a perspective view of a support tray.

As illustrated in greater detail in FIG. 3, an implementation of the tire inflator 100 may further comprise a detachable air hose support tray 350 removably coupled to the first side 153 of the housing 150. The detachable air hose support tray 350 may comprise an annular channel 356 on a first side surrounding a raised central projection 358 and a post 354 extending radially from the support tray 350. An implementation of the support tray comprises a raised wall 364 surrounding annular channel 356. The raised wall 364 may further comprise a reentrant opening 362 sized to hold the valve stem connector 110 of the hose 105.

Figure 5:
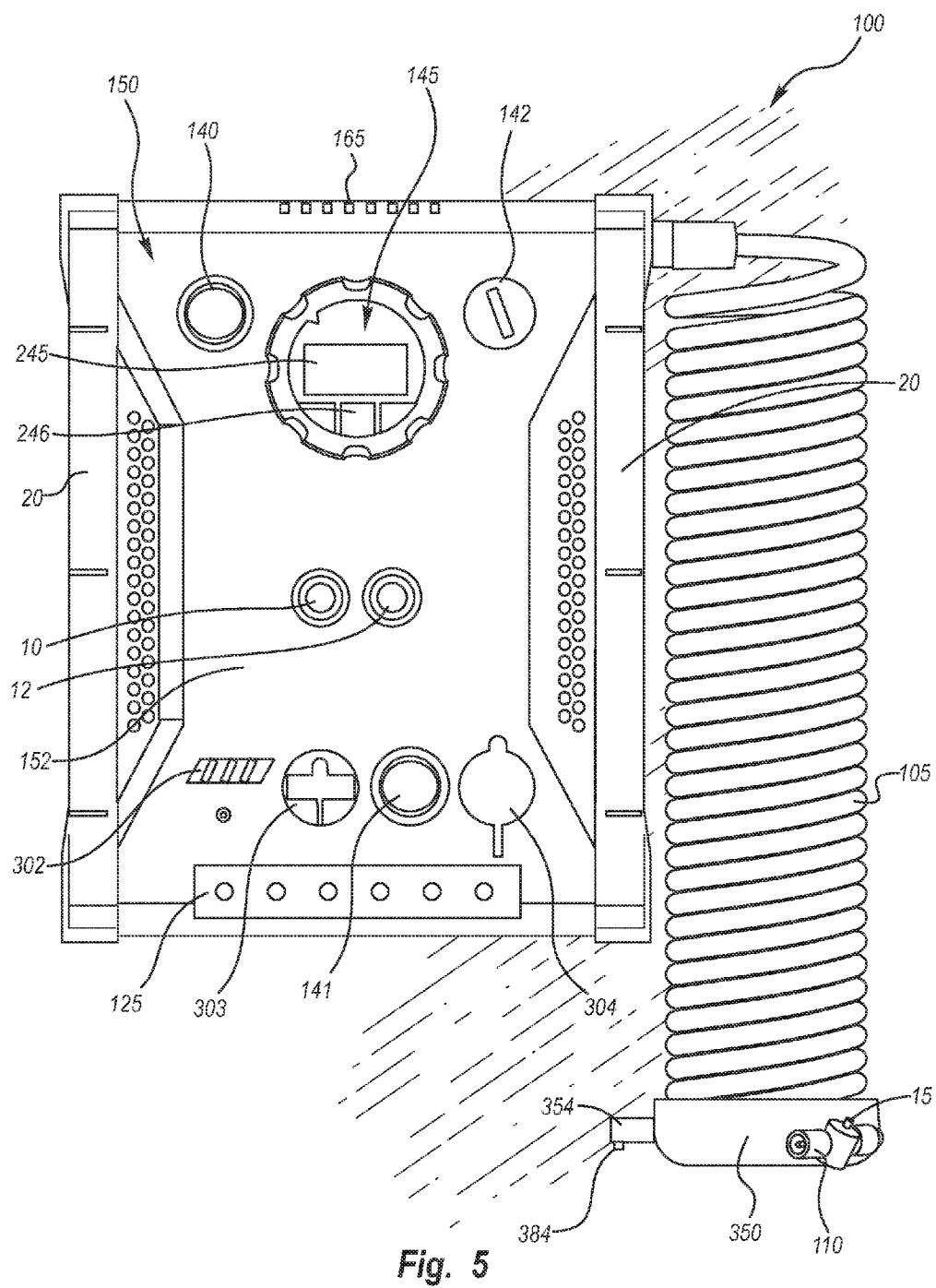
FIG. 5 is a front view of a portable wall-mount inflator with a support tray mounted separately.

The support tray 350 may further comprise a wall mounting aperture 360 extending through a portion of the support tray. The wall mounting aperture 360 may be any of varied sizes, such as but not limited to a larger aperture transitioning to a smaller aperture. A central projection channel 352 may be disposed within the central projection 358 that allows a user to insert a post, screw, nail, or other mounting device through the wall mounting aperture 360. The annular channel 356 may be sized to hold an end of a coiled hose 105, while the central projection 358 may be sized to fit within the void formed by the coiled hose 105. In use, the support tray 350 may be rotated and unlocked from the housing 150 and mounted separately from the housing 150 at a different position on the wall from the housing to accommodate a longer hose 150, for example, or to accommodate wall mounting preferences of an installer. An example of this is illustrated in FIG. 5.

Figure 4:
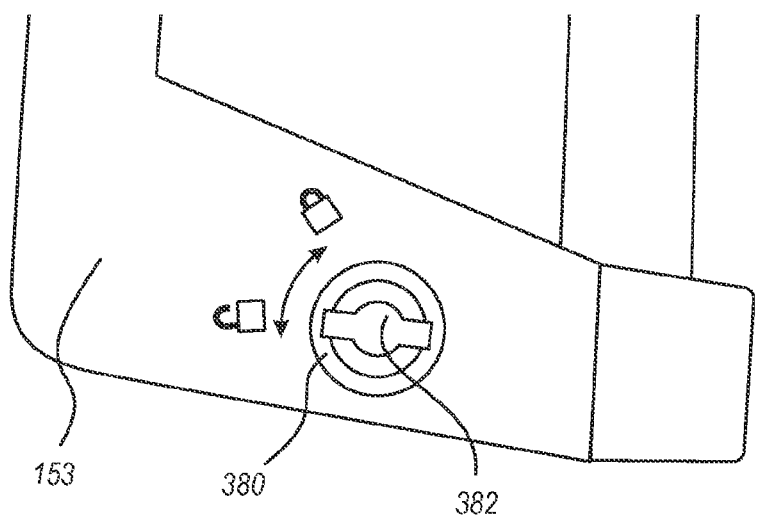
FIG. 4 is a close-up view of a post opening.

The post 354 may be sized to fit within an opening 380 (shown in FIG. 4) on the first side 153 of the housing 150. In an implementation, the post may comprise a key 384 on a leading end of the post 354. The key 384 may be configured to fit between key walls 382 within an internally L-shaped hole 380 of the housing 150 such that the post key 384 extends within the housing 150 beyond key walls 382 following the top of the L shape and when the key shape is rotated to follow the lower portion of the L shape, the key walls 382 support the key 384 and lock it into place within the housing supporting the post 354 and support tray 350.

Figure 6:
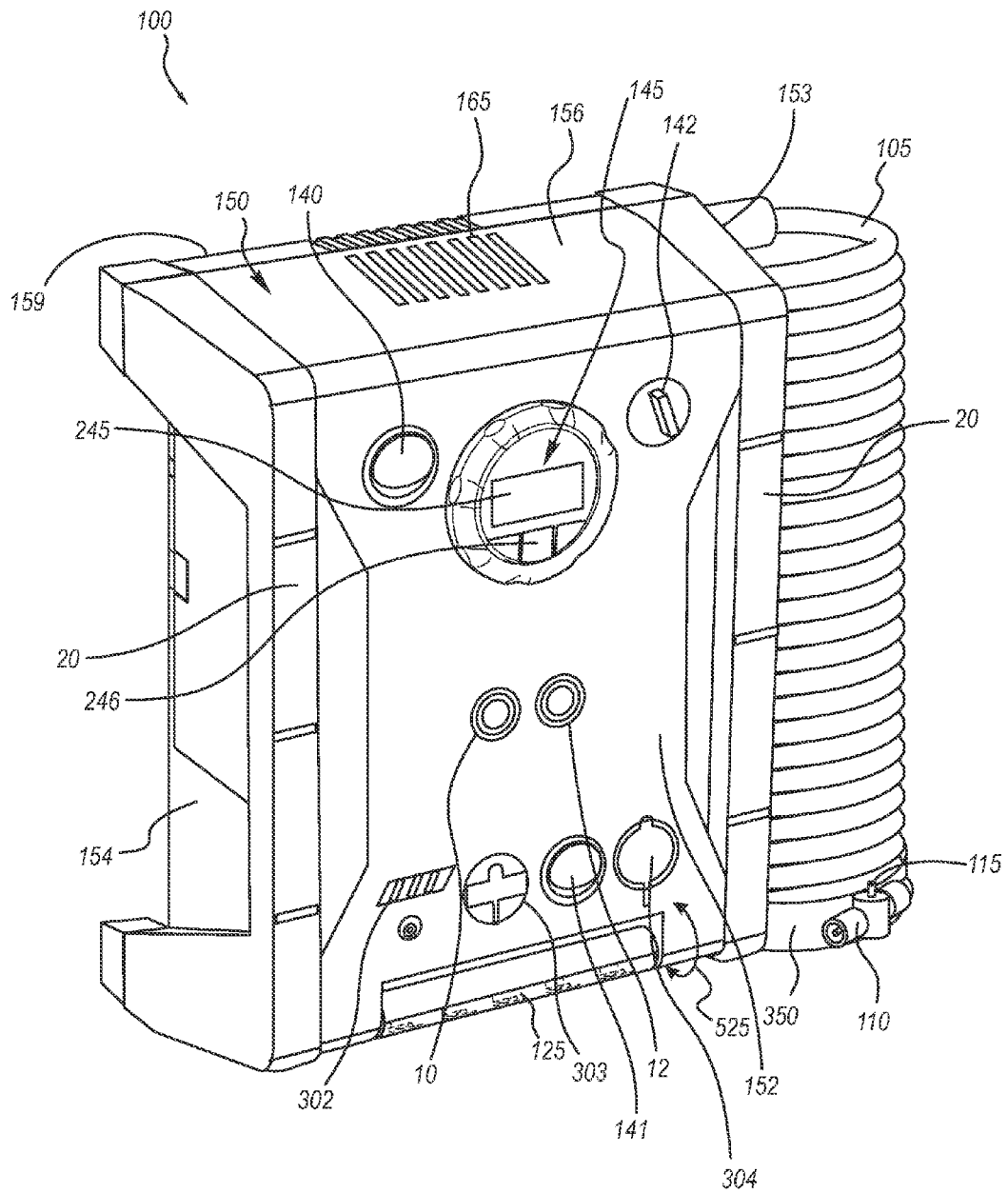
FIG. 6 is an end view of a portable wall-mount inflator with a light source rotated to the end side.

Returning again to FIG. 1, an implementation of the tire inflator 100 may comprise a light source. In an implementation, the light source may comprise a light bar 125 pivotally coupled to the housing 150 at an intersection of the face 152 and one side of the four sides. FIG. 1 illustrates the light bar 125 rotated to face the face 152 of the housing 150. The light bar 125 is adapted to pivot at least 90 degrees to emit light from either the face 152 or the one side. FIG. 6 illustrates the rotation 525 of the light bar 125, the light bar 125 having been rotated 90 degrees to face the end of the housing 150. The light source may comprise any type of light, such as but not limited to light emitting diode (LED) lights, incandescent lights, iridescent lights, and the like.

A tire inflator 100 may further comprise a light source switch 142. The light source switch 142 is electrically coupled to at least the light source. The light source switch 142 may be further electrically coupled to the pump motor, the rechargeable battery, or any other electrical power source. In an implementation, the light source switch 142 may comprise a plurality of settings or positions that determine the strength of the light source, such as but not limited to a high position, low position, and an off position.

Various implementations of a tire inflator 100 may further comprise a pump power switch 140 disposed anywhere on the housing 150. The power switch may be electrically coupled to the pump motor alone, or a combination of the pump motor, the light bar 125, and/or any other feature on the tire inflator 100. The power switch 140 be configured to turn on or activate the light source in a first position, turn on or activate both the light bar 125 and the pump motor in a second position, and turn off or deactivate both the light bar 125 and the pump motor in a third position. In other implementations, a tire inflator 100 may comprise a plurality of power switches disposed at various locations on the housing 150. Each of the plurality of power switches may be assigned or electrically coupled to different functions or elements, such as but not limited to a power switch for the light source 125, a power switch for the pump motor, a power switch for a tire pressure gauge, or a power switch to activate rechargeable battery or any other power source. In the implementation of FIG. 1, the tire inflator 100 further comprises a main power switch 141 that controls the overall power to the entire tire inflator 100.

A tire inflator 100 may further comprise a pressure indicator 145 positioned anywhere on the housing 150 of the tire inflator 100. In the implementation illustrated in FIG. 1, the pressure indicator 145 is positioned on the face 145 of the housing 150. Placement of the various components in the particular implementation illustrated in FIG. 1 allows for a small, portable unit. The pressure indicator 145 is responsive to air pressure within the air hose 105, the pump motor, the valve stem connector 110, or the tire the air hose 105 to which the air hose is connected. In an implementation, the pressure indicator 145 displays the approximate air pressure of air within the tire during pumping by indicating the air pressure within the air hose 105, or equivalently the air pressure exerted on the pump motor. It should be understood that reference herein to air pressure within the air hose may equivalently be any display of air pressure value or preset air pressure values that are an approximation of actual values or the display of values substantially similar to actual air pressure values within the air hose as air pressure measurements anywhere within the system will give an approximation of the air pressure within the tire being inflated.

In an implementation, the pressure indicator 145 may comprise a radial air pressure gauge and a needle that together are responsive to tire air pressure and/or air hose 105 air pressure during use of the tire inflator 100. For example, the radial air pressure gauge may comprise range of air pressure values spread annularly across the radial air pressure gauge, often in a plurality of measurement units, such as pounds per square inch (PSI), bars, atmospheres, and the like. When the pump motor is in use, the needle may move to a position along the annularly arrange pressure values to indicate air pressure within the air hose 105.

In another implementation, the pressure indicator 145 may comprise a digital air pressure gauge 245 response to tire air pressure and/or air hose 105 air pressure during use of the tire inflator 100. The digital air pressure gauge 245 may display either a numeric air pressure, or a digital image similar to the radial air pressure gauge and needle previously described.

In various implementations, a tire inflator comprising a radial dial my further comprise a regulator dial 190 and a regulator marker 195. Implementations of the tire inflator 200 may further comprise an air pressure regulator or limiter associated with the pump motor to prevent the tire inflator from inflating a tire through the air hose 105 beyond a preset tire air pressure value. The air pressure regulator may act to completely deactivate the pump motor, reduce power of the pump motor to a lower pump motor setting, or open an exhaustion element that reduces air pressure within the air hose 105. The regulator dial 190 may be configured to rotate about the radial air pressure gauge such that the regulator marker establishes the preset tire air pressure value by pointing to an air pressure value on the radial air pressure gauge. In implementations comprising a digital air pressure gauge 245, a tire inflator 200 may comprise programming buttons 246 or other elements that allow a user to establish the preset tire air pressure value.

Various implementations of the tire inflator 100 may further comprise a variable speed pump motor. The variable speed pump motor is configured to allow a user to select between at least two pump speeds that then affect the air pressure exerted on the air hose 105 and the valve stem connector 110. For example, in an implementation, the tire inflator 100 may comprise a variable two-speed pump motor. In such an implementation, the variable two-speed pump motor comprises a low setting and a high setting, as well as an off setting. At a low setting, the pump motor exerts a lower pressure on the air hose 105 and valve stem connector 110 than the typical air pressure of a tire inflator.

In an implementation comprising a variable speed pump motor, the variable speed pump motor may comprise a "high volume low pressure" (HVLP) setting or capability. A HVLP setting is particularly effective for use in inflating rafts, flotation devices, air mattresses, or other low-pressure objects. An implementation of the tire inflator 100 comprising a HVLP setting may further comprise an inflation adapter or connector 12 and a deflation adapter or connector 10 on the face 152 of the tire inflator. The inflation 12 and deflation adapter 10 may be adapted to removably couple to additional hoses or elements to inflate low pressure items such as but not limited to rafts, mattresses, tubes, inflation devices, and the like.

Various implementations of a tire inflator 100 may comprise a battery level indicator 302, a fuse receiver 303, a 12 volt DC receiver 304, and/or a DC power intake on the face 152 or any other area of the housing 150. The 12 volt DC receiver 304 is electrically configured to transmit power to a 12 volt electrical device.

Various implementations of the tire inflator 100 may further comprise at least one handle 20 positioned on the housing 150. In the implementation illustrated in FIG. 1, the tire inflator 100 comprises two handles 20, one positioned on each side of the housing 150. The handles 20 may comprise any variety of sizes, configurations, positions, and the like that allow a user to grip the handles 20.

Figure 2:
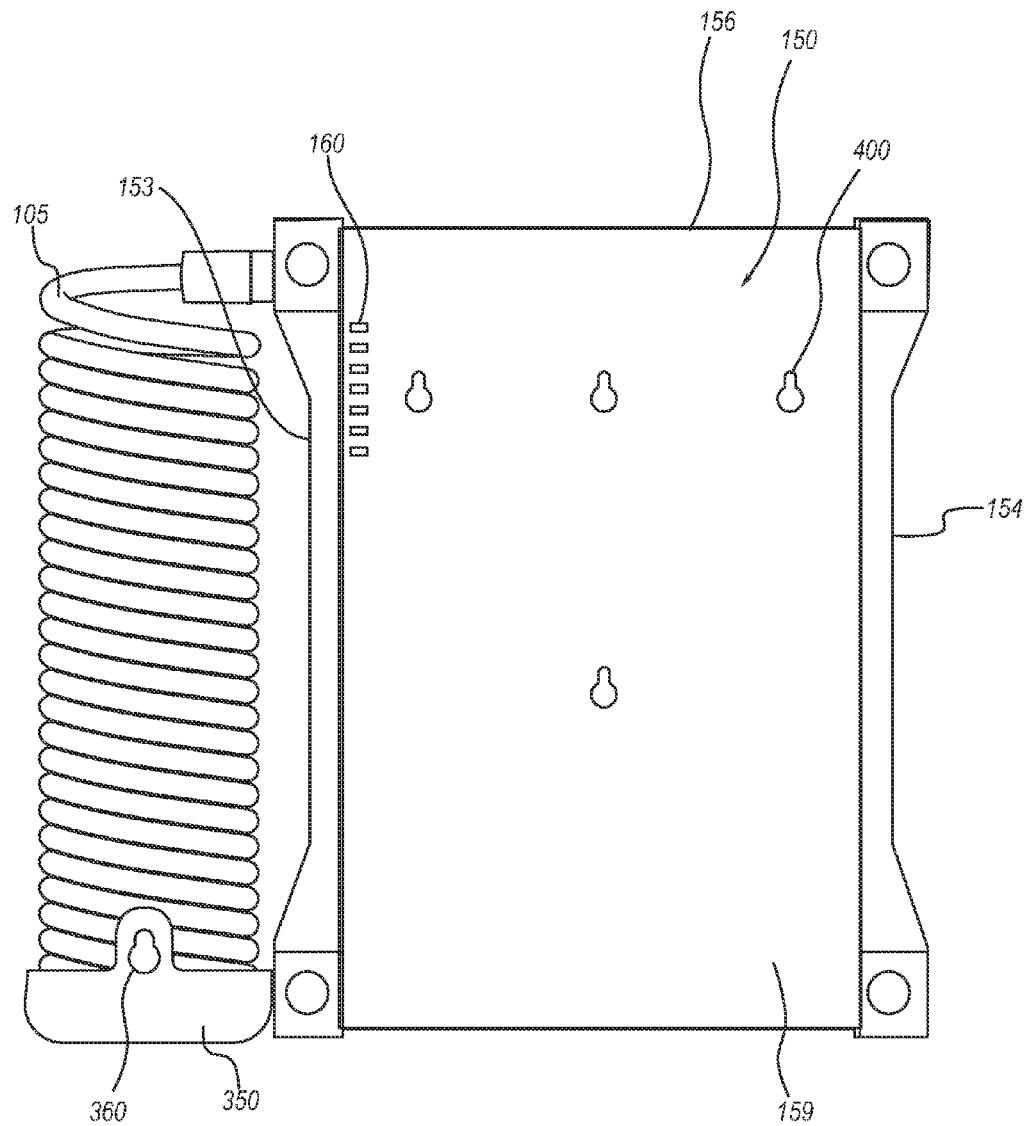
FIG. 2 is a rear view of a portable wall-mount inflator.

Referring now to FIG. 2, a rear view of a tire inflator 100 is illustrated. In an implementation, the tire inflator 100 comprises at least one wall mounting element 400 on the backside 159 of the housing 150. The wall mounting element 400 comprises any element adapted to couple with a wall mount structure extending from a wall.

It will be understood that implementations are not limited to the specific components disclosed herein, as virtually any components consistent with the intended operation of a method and/or system implementation for tire inflators may be utilized. Accordingly, for example, although particular tire inflators may be disclosed, such components may comprise any shape, size, style, type, model, version, class, grade, measurement, concentration, material, weight, quantity, and/or the like consistent with the intended operation of a method and/or system implementation for a tire inflators may be used.

In places where the description above refers to particular implementations of tire inflators, it should be readily apparent that a number of modifications may be made without departing from the spirit thereof and that these implementations may be applied to other tire inflators. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A wall-mountable tire inflator, comprising:
    a housing comprising a variable pressure pump motor and rechargeable battery therein, a face, a backside opposite the face, and four sides extending between the face and the backside;
    at least one wall mounting element on the backside of the housing adapted to couple with a wall mount structure extending from a wall;
    a light bar pivotally coupled to the housing at an intersection of the face and one side of the four sides, the light bar adapted to pivot at least 90 degrees to emit light from either the face or the one side;
    a coiled air hose extending from the housing and in fluid communication with the pump motor such that when the pump motor is activated pressurized air from the pump motor is passed to the air hose;
    an air pressure indicator responsive to air pressure within the air hose, the air pressure indicator visible on an external surface of the housing;
    a detachable air hose support tray comprising an annular channel on a first side surrounding a raised central projection, a post extending radially from the support tray and a wall mounting aperture extending through a portion of the support tray;
    an opening in the housing sized to receive the post of the air hose support tray; and
    a power switch disposed on the housing and electrically coupled to the light bar and to the pump motor.

2. The wall-mountable tire inflator of claim 1, the housing further comprising first and second handles extending therefrom and parallel to each other.

3. The wall-mountable tire inflator of claim 2, further comprising a pump power switch configured to alternate settings of the pump motor between off, low, and high settings.

4. The wall-mountable tire inflator of claim 3, further comprising a light switch configured to activate or deactivate the pivoting light bar.

5. The wall-mountable tire inflator of claim 4, further comprising an air pressure regulator operably associated with the motor to prevent the tire inflator from inflating a tire through the air hose beyond a preset tire air pressure value.

6. The wall-mountable tire inflator of claim 5, wherein the air pressure display comprises a digital air pressure gauge that displays tire air pressure during tire inflator use.

7. The wall-mountable tire inflator of claim 6, further comprising programming buttons on the digital air pressure gauge, the programming buttons operable to allow a user to establish the preset tire pressure value.

8. The wall-mountable tire inflator of claim 7, further comprising an inflation adapter and deflation adapter on the face of the body.

9. The wall-mountable tire inflator of claim 8, further comprising a 12 volt DC receiver on the face of the housing, the 12 volt DC receiver electrically configured to transmit power to 12 volt electrical device.

10. The wall-mountable tire inflator of claim 9, further comprising a fuse receiver on the face of the housing, the fuse receiver configured to receive an electrical fuse.

11. The wall-mountable tire inflator of claim 1, wherein the support tray further comprises a wall around the annular channel, the wall comprising a reentrant opening.

12. The wall-mountable tire inflator of claim 11, wherein the center projection comprises a center projection channel therethrough aligned with the wall mounting aperture.

13. The wall-mountable tire inflator of claim 12, the support tray projection further comprising a key at a leading end of the projection.

14. The wall-mountable tire inflator of claim 13, the opening in the housing further comprising an opening shape that mates with the key of the projection leading end, the mating of the projection and the opening comprising a first position wherein the projection is unlocked and moves freely in and out of the opening, and a second position wherein the projection is locked and is restricted in its movement from the opening.

15. A tire inflator, comprising:
- a housing comprising a variable pressure pump motor therein;
- a coiled air hose extending from the housing and in fluid communication with the pump motor such that when the pump motor is activated pressurized air from the pump motor is passed to the air hose;
- an air pressure indicator responsive to air pressure within the air hose, the air pressure indicator visible on an external surface of the housing;
- a valve stem connector on a valve stem end of the air hose distal the housing;
- a light bar coupled to the housing wherein the light bar is pivotally coupled to the housing at an intersection of a face of the housing and a side of four sides of the housing, and the light bar is adapted to pivot at least 90 degrees to emit light from either the face or the one side;
- a power switch disposed on the housing and electrically coupled to the light bar and to the pump motor;
- a detachable air hose support tray comprising an annular channel on a first side surrounding a raised central projection, a post extending radially from the support tray and a wall mounting aperture extending through a portion of the support tray;
- a wall around the annular channel, the wall comprising a reentrant opening; and
- an opening in the housing sized to receive the post of the air hose support tray.

16. The wall-mountable tire inflator of claim 15, wherein the center projection comprises a center projection channel therethrough aligned with the wall mounting aperture.

* * * * *